United States Patent [19]
Oya et al.

[11] Patent Number: 6,107,788
[45] Date of Patent: Aug. 22, 2000

[54] POWER SUPPLY UNIT FOR USE BY ON-VEHICLE EQUIPMENT

[75] Inventors: Hironobu Oya, Saitama; Eiichi Tanaka, Kanagawa, both of Japan

[73] Assignee: Sony Corporation, Tokyo, Japan

[21] Appl. No.: 09/286,369

[22] Filed: Apr. 5, 1999

[30] Foreign Application Priority Data

Apr. 6, 1998 [JP] Japan ................... 10-093649

[51] Int. Cl.$^7$ ................... G05F 5/00; B60L 1/00
[52] U.S. Cl. ................... 323/299; 307/10.1
[58] Field of Search ................... 307/150, 9.1, 10.1, 307/10.7; 323/222, 259, 299

[56] References Cited

U.S. PATENT DOCUMENTS

| | | | |
|---|---|---|---|
| 4,127,782 | 11/1978 | Omura et al. | 307/10.1 |
| 5,097,815 | 3/1992 | Oota et al. | 123/606 |

*Primary Examiner*—Jessica Han
*Attorney, Agent, or Firm*—Frommer Lawrence & Haug, LLP.; William S. Frommer; Matthew K. Ryan

[57] ABSTRACT

A power supply unit for use by on-vehicle equipment, including a booster portion and a circuit portion. The booster portion boosts a supply voltage from an onboard battery of a vehicle and feeds the boosted supply voltage to the circuit portion. The booster portion is separated from the circuit portion and located close to the onboard battery of the vehicle.

4 Claims, 2 Drawing Sheets

POWER SUPPLY UNIT FOR USE BY ON-VEHICLE EQUIPMENT

BACKGROUND OF THE INVENTION

The present invention relates to a power supply unit for use by on-vehicle equipment.

Today, more and more people riding stereo-equipped vehicles are enjoying music on full blast using onboard subwoofers. To drive the subwoofers requires installing a large-output power amplifier.

This type of power amplifier consumes currents ranging from 20 at minimum to hundreds of amperes. For example, to drive 4Ω subwoofers on two channels (100 W, non-clip) requires furnishing a common linear amplifier (AB class) dissipating about 30 A.

FIG. 2 is a block diagram of a related art power amplifier meeting the above requirements. As illustrated, a power amplifier 40 placed inside of a trunk room 30 is powered by a battery 20 in an engine room 10 through wires "a" and "a'". In operation, the power amplifier 40 boosts the power from the battery 20 using a booster type DC—DC converter 42 and the boosted power drives a circuit load 44. Lines "b" and "b'" connect the booster type DC—DC converter 42 with the circuit load 44. The ground wire "a'" of the booster type DC—DC converter 42 is connected to vehicle body ground.

In the setup above, suppose that the battery voltage is 12V and that the wires "a" and "a'" carry a current of 30 A. In that case, if the battery voltage is boosted by the booster type DC—DC converter 42 by six times to 72V (or ±36V) and the conversion efficiency of the booster type DC—DC converter 42 is 100 percent, the current flowing through the wire "b" and "b'" is defined in the following equation: battery voltage×current flowing in wire "a"=boosted voltage×current flowing in wire "b". That is, there exists the relationship in which Ib denotes the current flowing in the wire "b":

$$12(V) \times 30(A) = 72(V) \times Ib(A)$$

which means;

$$Ib(A) = 5(A)$$

It can be seen that the current diminishes in inverse proportion to boosting ratios.

The related art setup above has some disadvantages. Specifically, an appreciably long distance between the battery 20 and the booster type DC—DC converter 42 necessitates a large current to flow in the extended wire "a". This involves a significant loss of current over the wire. Illustratively, if the wire "a" is a 10-meter-long vinyl-sheathed wire (equivalent to AWG 8) with a cross-sectional sectional area of 8 mm², then a voltage drop of 0.7V occurs over the wire "a" which weighs as much as one kilogram or thereabout.

The larger the current, the greater the voltage drop entailing further loss of power. Where the length of the wire is fixed, there is only one way to forestall the voltage drop: increase the cross-sectional area of the wire. Inevitably, the wire becomes heavier than ever.

SUMMARY OF THE INVENTION

It is therefore an object of the present invention to provide for use by on-vehicle equipment a power supply unit which minimizes transmission loss when supplying a boosted onboard battery voltage to a circuit portion and which is germane to reducing the weight of wires in use.

In carrying out the invention and according to one aspect thereof, there is provided a power supply unit for use by on-vehicle equipment, comprising a booster portion and a circuit portion, the booster portion boosting a supply voltage from an onboard battery of a vehicle and feeding the boosted supply voltage to the circuit portion, wherein the booster portion is separated from the circuit portion and located close to the onboard battery of the vehicle.

In the inventive power supply unit, the supply voltage of the onboard battery is boosted by the booster portion and fed to the circuit portion. Whereas a large current flows from the onboard battery to the booster portion, the battery and the booster portion are located close to each other, accordingly they are connected by short wires whose transmission loss is practically negligible.

The booster portion is separated from the circuit portion and there exist extended wires therebetween. But the current flowing in these wires is smaller than that flowing in the wires in effect before the supply voltage was boosted. That means the transmission loss over the long wires is made insignificant. As a result, the cross-sectional area of the wires is allowed to be small, which translates into a reduced weight of the wires as a whole.

Other objects, features and advantages of the invention will become more apparent upon a reading of the following description and appended drawings.

DETAILED DESCRIPTION OF THE PREFERRED EMBODIMENT

Figure 1:
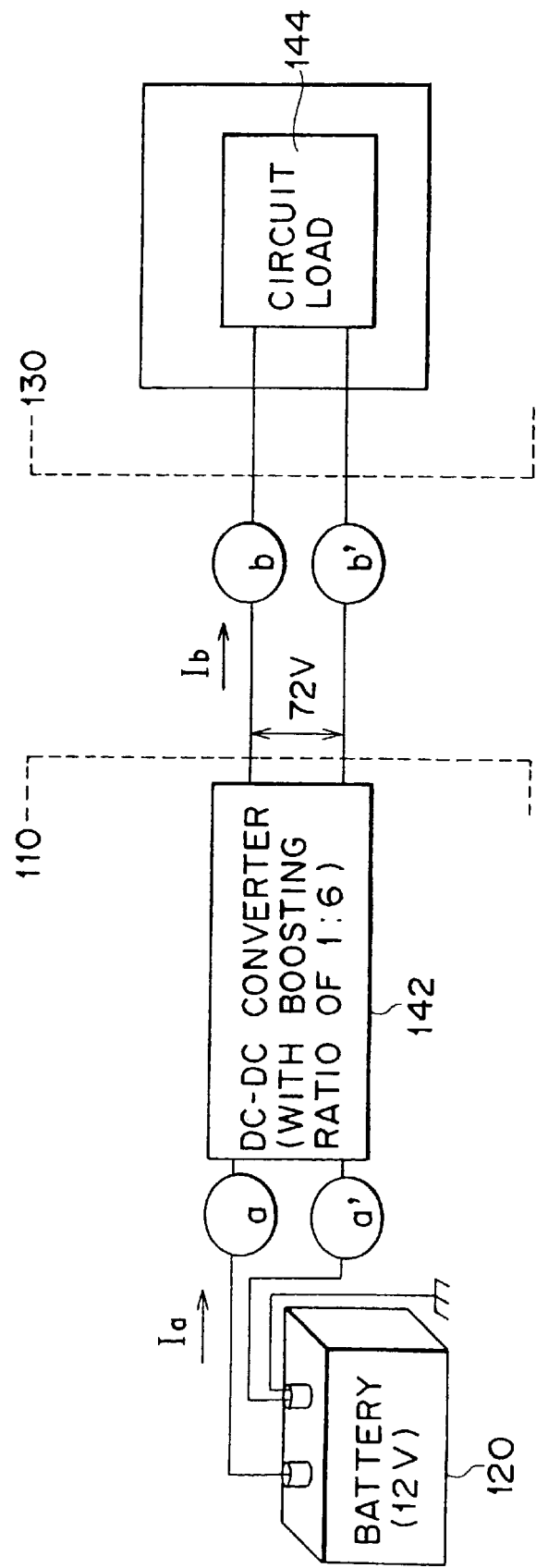
FIG. 1 is a block diagram of a power supply unit which is for use by on-vehicle equipment and which embodies the invention.

A preferred embodiment of this invention will now be described with reference to the accompanying drawings. FIG. 1 is a block diagram of a power supply unit used by on-vehicle equipment and embodying the invention. The inventive power supply unit is installed illustratively on board a vehicle to drive a power amplifier of onboard audio equipment.

With this embodiment, a booster type DC—DC converter 142 in an engine room 110 is powered by a battery 120 in the engine room 110 using wires "a" and "a'". A supply voltage boosted by the booster type DC—DC converter 142 is fed over wires "b" and "b'" to a circuit load 144 in a trunk room 130. The ground wire "a'" of the booster type DC—DC converter 142 is connected directly to a ground terminal of the battery 120.

The supply voltage of 12V from the battery 120 is boosted by double through 20 times (e.g., raised by six times to 72V in the figure) by the booster type DC—DC converter 142 and thus boosted voltage is supplied to the circuit load 144. Assuming that the boosting factor of the booster type DC—DC converter 142 is six, then a current Ia of 30 A from the battery 120 is boosted by the booster type DC—DC converter 142 to turn it into a current Ib of 5 A, which is then fed to the circuit load 144.

Figure 2:
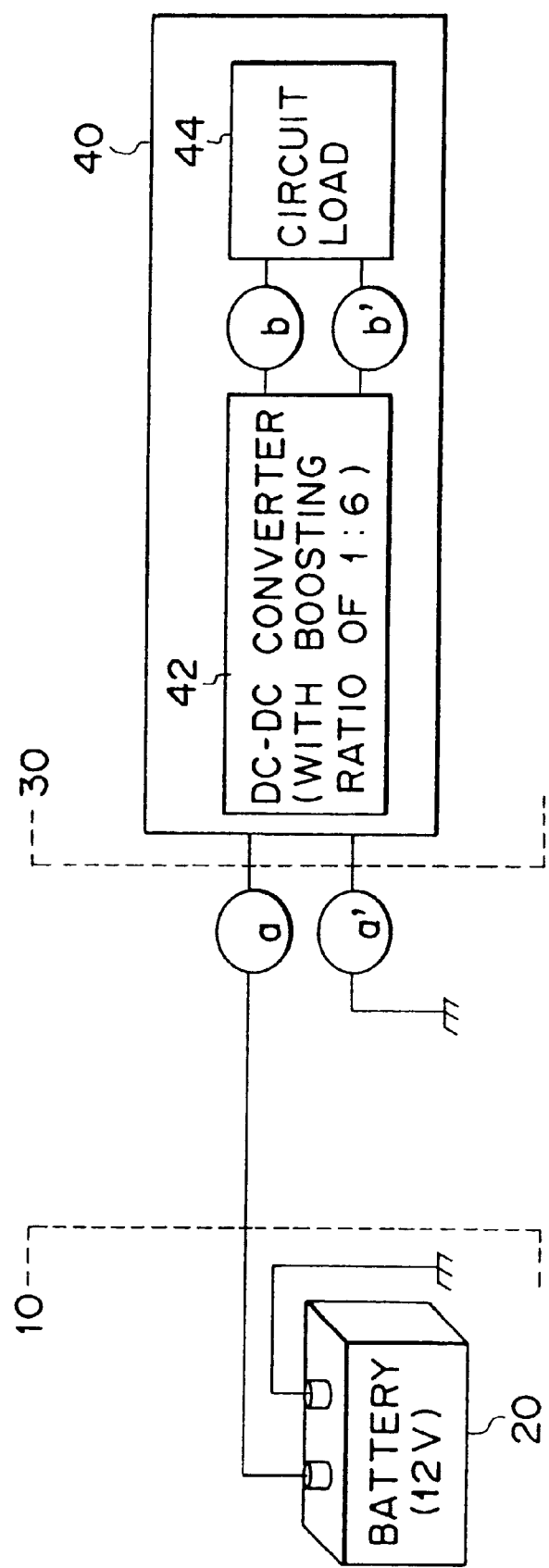
FIG. 2 is a block diagram of a related art power supply unit for use by on-vehicle equipment.

As in the related art setup of FIG. 2, the booster type DC—DC converter 142 and the circuit load 144 of the embodiment constitute a power amplifier of onboard audio equipment. In the makeup of FIG. 1, the booster type DC—DC converter 142 is separated from the circuit load 144 as illustrated. The booster type DC—DC converter 142 is installed together with the battery 120 in the engine room 110 while the circuit load 144 is located in the trunk room 130. Thus, this layout shortens the wire "a" and extends the wire "b".

Because the wire "a" is shortened between the battery 120 and the booster type DC—DC converter 142, the overall resistance value of the wire is reduced. The lowered resistance translates into a reduction in transmission loss over the wire "a" caused by a large current. Illustratively, if the wire "b" is 10-meter-long and has a cross-sectional area of 1.25 mm$^2$(equivalent to AWG 16), then the voltage drop along the wire is 0.7V. In that case, the wire "b" weighs about 0.16 kg.

By contrast, if the wire "a" is 10-meter-long and has a cross-sectional area of 8 mm$^2$ (equivalent to AWG 8) as in the related art setup, the voltage drop along the wire is 0.7V and the wire "a" weighs about one kilogram. In this case, the voltage drop of 0.7V along the wire "a" is raised by six times by the booster type DC—DC converter 142, amounting in 4.2V in the output stage of the booster type DC—DC converter 142. Thus, if the voltage drop were to be limited to 0.7V or less after the boosting operation, the wire "a" would have to have a cross-sectional area of 48 mm$^2$ causing the wire "a" to weigh as much as six kilograms.

Such inconveniences are averted by the makeup of FIG. 1 wherein the booster type DC—DC converter 142 and the circuit load 144 constituting a power amplifier are separated from each other. The booster type DC—DC converter 142 is located together with the battery 120 in the engine room 110 while the circuit load 144 is housed in the trunk room 130. Thus, this layout shortens the wire "a" while extending the wire "b". This effectively reduces voltage loss over the wires and allows the wires to weigh less. Such improvements render the power supply system lighter in weight and more efficient than before.

The distance between the booster type DC—DC converter 142 and the battery 120 is determined in accordance with how much space is available in the engine room 110. There may be cases where the booster type DC—DC converter 142 and the battery 120 need to be somewhat separated under space constraints. These cases, however, are also included in the definition of closeness between the converter and the battery according to the invention.

Because the inventive power supply unit has the booster type DC—DC converter 142 located close to the battery 120 and separated from the circuit load 144, any switching noise of the booster type DC—DC converter 142 does not reach the circuit load 144. Another advantage is that the close location of the booster type DC—DC converter 142 relative to the battery 120 suppresses ripples. Furthermore, the fact that the ground wire "a'" of the booster type DC—DC converter 142 is connected directly to the ground terminal of the battery 120 provides higher sound quality than when a car body ground is utilized for grounding purposes as in the conventional setup.

Although the description above contains many specificities, these should not be construed as limiting the scope of the invention but as merely providing illustrations of the presently preferred embodiment of this invention. For example, whereas the embodiment above was shown having the circuit load 144 included in the trunk room of the vehicle, this is not limitative of the invention. Alternatively, the circuit load 144 may be located where appropriate in keeping with the vehicle structure. The on-vehicle equipment is not limited to the power amplifier of the onboard audio equipment. The equipment may be any device which, used on board a vehicle, boosts a battery voltage and supplies the boosted voltage to various onboard applications. Specific values used in the foregoing explanation are only for illustrative purposes and are not limitative of the invention.

Thus the scope of the invention should be determined by the appended claims and their legal equivalents, rather than by the examples given.

What is claimed is:

1. A power supply unit for use by on-vehicle equipment comprising:

a booster portion and a circuit portion, said booster portion boosting a supply voltage from an onboard battery of a vehicle and feeding the boosted supply voltage to said circuit portion; wherein said booster portion is separated from said circuit portion and located close to said onboard battery of said vehicle wherein said onboard battery and said booster portion are placed in an engine room of said vehicle and said circuit portion is placed in a trunk room of said vehicle.

2. A power supply unit for use by on-vehicle equipment according to claim 1, wherein said booster portion and said circuit portion constitute a power amplifier of onboard audio equipment of said vehicle.

3. A power supply unit for use by on-vehicle equipment according to claim 2, wherein a ground wire of said booster portion is connected to a ground terminal of said onboard battery.

4. A power supply unit for use by on-vehicle equipment according to claim 1, wherein said booster portion is a booster type DC—DC converter.

* * * * *